United States Patent [19]

Culver et al.

[11] Patent Number: 4,500,781
[45] Date of Patent: Feb. 19, 1985

[54] METHOD AND APPARATUS FOR DETERMINING NEUTRON CHARACTERISTICS OF BOREHOLE FLUIDS

[75] Inventors: Richard B. Culver; Donald W. Oliver, both of Houston, Tex.

[73] Assignee: Dresser Industries, Inc., Dallas, Tex.

[21] Appl. No.: 383,052

[22] Filed: May 28, 1982

[51] Int. Cl.$^3$ ............................................... G01V 5/10
[52] U.S. Cl. .................................................... 250/269
[58] Field of Search ................................. 250/269, 270

[56] References Cited

U.S. PATENT DOCUMENTS

| | | | |
|---|---|---|---|
| 3,164,720 | 1/1965 | Armistead | 376/167 |
| 3,688,115 | 8/1972 | Antkiw | 250/269 |
| 4,137,452 | 1/1979 | Paap et al. | 376/162 |
| 4,384,205 | 5/1983 | Flaum | 250/265 |

OTHER PUBLICATIONS

C. E. Rinehart, H. J. Weber, "Measuring Thermal Neutron Absorption Cross-Sections of Formation Brines" SPWLA Publication, Jun. 1975, pp. 297–310, esp. FIG. 2, (p. 308).

*Primary Examiner*—Janice A. Howell
*Assistant Examiner*—Constantine Hannaher
*Attorney, Agent, or Firm*—Patrick H. McCollum; Richard M. Byron

[57] ABSTRACT

A source of high energy neutrons and a detector responsive to the thermal neutron population decay rate are utilized in a well logging instrument. The instrument is positioned within a borehole and at least a portion of the fluids within the borehole are irradiated with high energy neutrons. The thermal neutrons emanating from the irradiated fluids are detected and measured. The thermal neutron counts are converted into a time base measurement which is further converted into a measurement of the thermal neutron capture cross-section for the irradiated fluids.

6 Claims, 4 Drawing Figures

METHOD AND APPARATUS FOR DETERMINING NEUTRON CHARACTERISTICS OF BOREHOLE FLUIDS

BACKGROUND OF THE INVENTION

This invention relates generally to the art of radioactivity well logging and, more particularly, to a method and an apparatus for determining the thermal neutron capture cross-section of fluids in a well bore.

It is known in the search for oil and gas to extend drill holes through the earth formations and that these holes are normally filled with fluids, which include either/or both oil and water. Additionally, it is becoming more common in enhanced recovery operations, such as secondary and tertiary recovery projects, to inject fluids into the borehole and the adjacent formations, typically in the form of a brine solution. These forms of enhanced recovery projects are commonly referred to as log-inject-log operations.

During log-inject-log operations it may be desirable to allow the detection of where the fluid is going for the first few feet of formation, where the fluid is injected, which is useful in determining residual oil saturation in the formations. One type log-inject-log procedure involves operating a pulsed neutron decay log opposite the zone or zones of interest in a well, injecting a water solution with contrasting salinity into the zone of interest, and performing a second pulsed neutron decay log. In this method, the log readings from the two surveys are used to calculate residual-oil-saturation (ROS) from the expression:

$$Ros = \frac{\Sigma_2 - \Sigma_1}{\phi(\Sigma_{w2} - \Sigma_{w1})}$$

where
- $\Sigma_1$ = Thermal neutron absorption cross-section from the first log,
- $\Sigma_2$ = Thermal neutron absorption cross-section from the second log,
- $\Sigma_{w1}$ = Thermal neutron absorption cross-section of original formation water, and
- $\Sigma_{w2}$ = Thermal neutron absorption cross-section of injected fluid.

The injection solution used is composed by combining water with a known amount of sodium-chloride to provide a salt-water solution for which the absorption cross-section can be calculated. It is not uncommon during the course of the injection process to be required to mix more than one quantity of such injection fluid and further it is not uncommon for the absorption cross-section to differ slightly from one mixture to the next mixture. One method of controlling the quality of injection fluid is to measure the absorption cross-section of each individual mixture solution to determine that the absorption cross-sections are constant throughout all the mixtures.

A related problem is encountered in that it has proven to be difficult to measure the absorption cross-section of very small fluid samples. This difficulty is based on two facts. First, the absorption cross-section of fluids is not based solely on the salinity of the fluids. Impurities, such as trace amounts of boron, and/or gadolinium can significantly alter the absorption cross-section of the fluids making measurements unreliable. A second difficulty in determining the absorption cross-section of small fluid samples is that when using a pulsed neutron source there are unique diffusion effects which will alter the neutron decay rate. These diffusion effects will cause to be measured a slightly modified decay rate which is not the true absorption cross-section of the fluid samples.

These and other disadvantages are overcome with the present invention by providing a method and an apparatus for continuously determining the salinity and the thermal neutron capture cross-section of fluids as a function of time or depth within a borehole.

SUMMARY OF THE INVENTION

In a preferred embodiment of the present invention, a well logging system is provided which in its overall concept includes an elongated housing containing a continuous source of high energy neutrons and a radiation detector spaced apart from the source. Borehole fluids enter a cavity located in the housing intermediate the source of neutrons and the detector. The borehole fluids serve as a moderating medium causing thermalization of the neutrons. The detector responds primarily to neutrons not absorbed by the moderating medium converting the incident particles into discrete electric pulses which are amplified and telemetried to a surface electronics comprised of an analyzer where the pulses are integrated and subsequently processeed to provide a measurement of the macroscopic cross-section for thermal neutron absorption (sigma ($\Sigma$)) of the fluids within the borehole.

These and other features and advantages of the present invention can be understood from the following description of the techniques of producing the invention described in conjunction with the following drawings.

DETAILED DESCRIPTION OF THE PREFERRED EMBODIMENT

Figure 1:
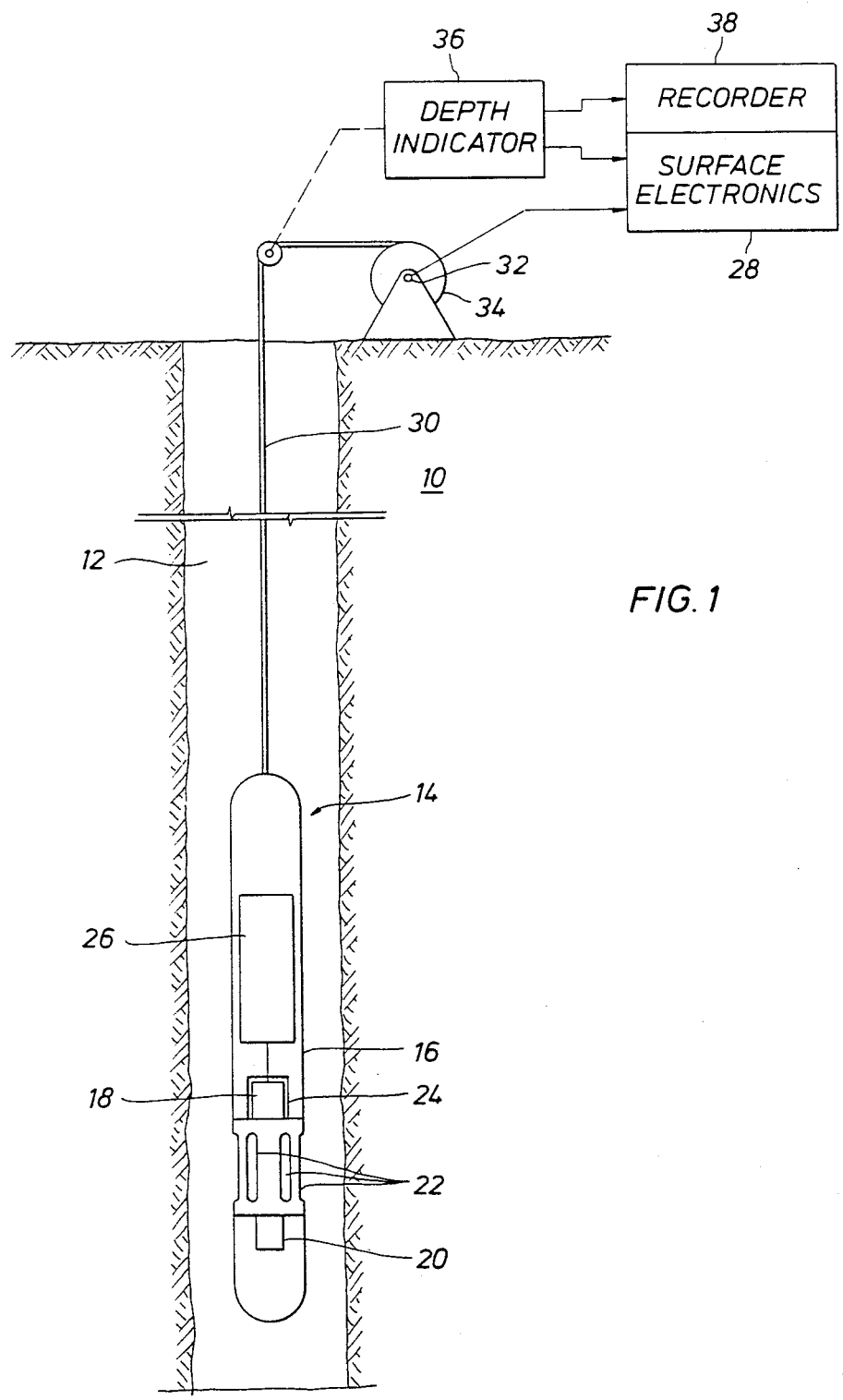
FIG. 1 is a side elevation, partly in cross-section, of a borehole logging instrument in operative position and its associated surface circuitry and related equipment.
Figure 2:
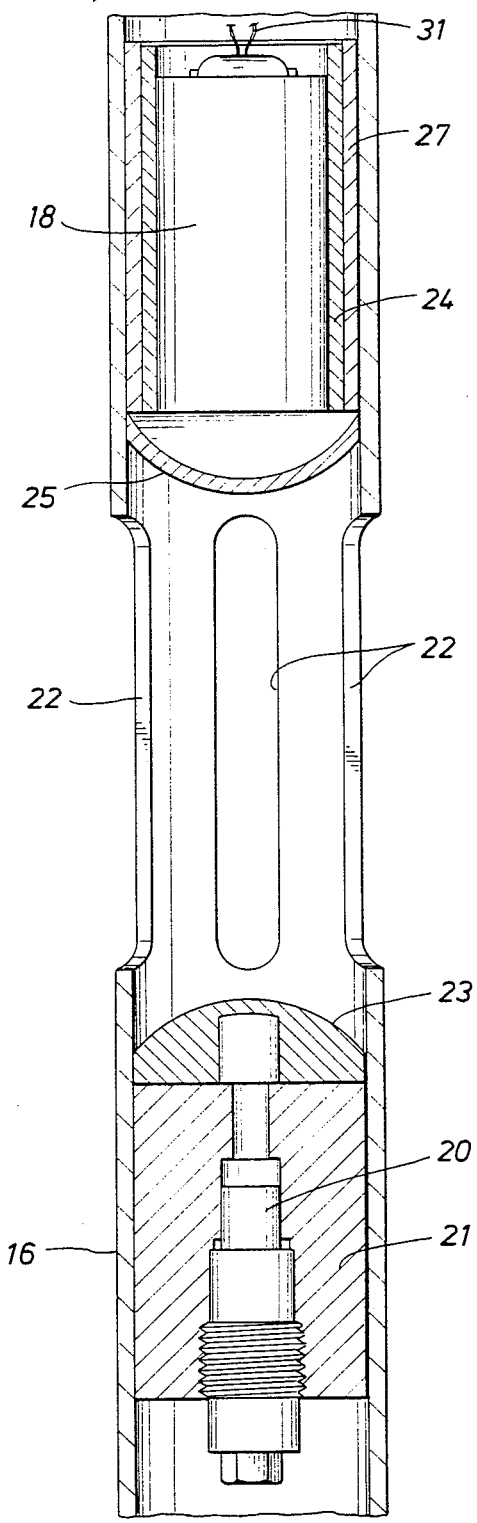
FIG. 2 is a more detailed view of the source/detector section of the subsurface instrument of FIG. 1.

Referring now to the drawings in more detail, particularly to FIG. 1, there is illustrated schematically a radioactivity well surveying operation in which a portion of the earth 10 is shown in vertical section. Well 12 penetrates the earth's surface and may or may not be cased. Disposed within well 12 is subsurface instrument 14 of the well logging system.

Subsurface instrument 14 comprises an elongated housing 16 containing a radiation detector 18 and a radiation source 20. Disposed intermediate detector system 18 and source 20 is a cavity within housing 16 in fluid communication with well 12 through apertures 22. Surrounding detector 18 is radiation shielding material 24. The output of detector system 18 is electrically coupled to subsurface electronics 26. Subsurface electronics 26 processes the output of detector 18 which is transmitted by electrical conductors within cable 30, through slip rings 32 located on the end of drum 34, to surface electronics 28. Cable 30 is wound on or unwound from drum 34 in raising and lowering instrument 14 to traverse well 12. As instrument 14 traverses well 12 the movement of cable 30 is measured by a suitable measuring device and coupled to depth indicator 36. The depth information from depth indicator 36 is coupled to surface electronics 28 and to recorder 38. Therefore, the measurement signals from instrument 14 can be related to depth within well 12.

Referring now to FIG. 12, therein is illustrated the source/detector section of subsurface instrument 14. Nuclear source 20 is preferably a constant output source of high energy neutrons. Source 20 can be a Californium source or an Americium/beryllium source, most preferably an AmBe source which emits neutrons at an average energy of approximately 3 Mev. Source 20 is mounted in mounting block 21 within housing 16. Block 21 is constructed of suitable dense material, preferably tungsten, to collimate the radiation emitted by source 20 into a beam which longitudinally traverses the cavity formed in housing 16 to inpinge detector 18.

Located in housing 16, between source 20 and detector 18, is a cavity or fluid chamber having a plurality of apertures, illustrated at 22, formed in housing 16 to allow free-flowing fluid communication between the chamber and the well. Both source 20 and detector 18 are isolated from the chamber by pressure domes 23 and 25, respectively. Domes 23 and 25 are constructed of a suitable material, such as steel, and are of such thickness as to withstand the pressure in the well and protect source 20 and detector 18 from the well environment while allowing penetration of the radiation.

Detector 18 consists of a means for detecting the radiation emitted by source 20, preferably a thermal neutron detector, most preferably a $^3$He proportional counter, suitable for detecting neutrons having an energy level below 0.025 electron volts. Detector 18 is surrounded by suitable shielding 24, preferably cadmium and/or gadolinium. Surrounding shielding 24 is a layer of moderating material 27. Moderating material 27 and shielding 24 minimize impinging of detector 18 by radiation downscattered by constituents of this wellbore and formation external to housing 16. The output of detector 18 is coupled through electrical conductors in cable 31 to subsurface electronics section 26 of FIG. 1 for processing.

In making a survey of the fluids within the borehole, instrument 14 can either be caused to traverse well 12 or can be stationed at selected depth locations within well 12. The high energy neutrons from source 20 are downscattered to thermal energies by the well fluid within housing 16 which has entered through apertures 22. These thermalized neutrons are then captured by nuclei within the moderating fluid. The rate at which the thermal neutrons are captured is proportional to the thermal neutron density. The density of thermal neutrons will build until the rate at which thermal neutrons are absorbed is equal to the rate supplied by source 20. Detector system 18 responds primarily to the thermal neutrons which are not absorbed by the moderating fluid. The number of neutrons captured in the fluid is proportional to the macroscopic cross-section for thermal neutron absorption; therefore, since source 20 produces neutrons at a constant rate, the number of thermal neutrons reaching detector system 18 per unit of time is inversely proportional to the macroscopic cross-section of the irradiated fluid. The $^3$He counter of detector 18 exhibits a high efficiency for thermal neutrons, a low sensitivity to neutrons with higher energies and an insensitivity to gamma radiation.

High energy neutrons from source 20 which are down scattered by well fluid outside housing 16 and constituents of this formation adjacent the selected depth may reach the vicinity of detector 18 at either thermal or epithermal energies. Moderating material 27 serves to reduce neutrons above thermal energy to thermal energy where the combined thermal energy neutrons are then captured within moderating material 27 or by shielding material 24. Accordingly, the impingment on detector 18 of such neutrons is minimized.

The thermal neutrons impinging upon detector 18 are converted by the detector into discrete electric pulses which are coupled to subsurface electronics 26. Subsurface electronics 26 typically comprises power supply circuits, amplifier circuits and telemetry circuits in a conventional manner. Subsurface electronics 26 transmits the electric pulses representative of detected thermal neutrons to surface electronics 28 by way of electrical conductors within cable 30 and slip rings 32 on drum 34.

Figure 3:
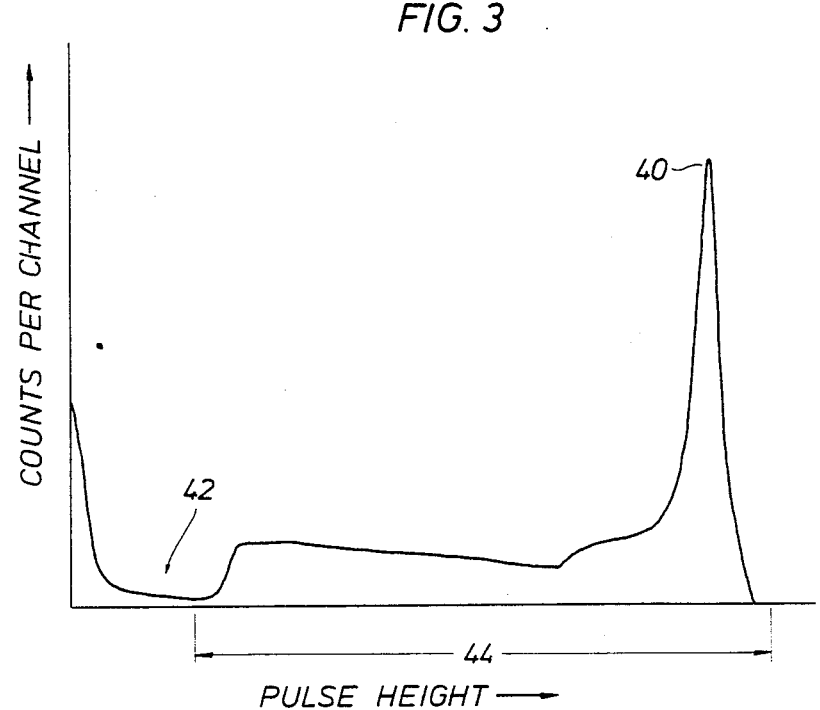
FIG. 3 graphically illustrates an energy spectrum resulting from the detection of thermal neutrons.

Surface electronics 28 includes a pulse height analyzer section. Such pulse height analyzer can be of a type such as a Tracor Northern 1710 or a Canberra 8100. A typical spectrum of counts versus energy for detector 18 is illustrated in FIG. 3. In FIG. 3 the ordinate represents the number of counts per channel of the analyzer and the abscissa represents the energy or pulse height. The large peak 40 results from the $^3$He (n,p)$^3$He nuclear reaction, which liberates 0.764 Mev of energy. Any gamma radiation interactions which take place in detector 18 will occur at very low energy and are eliminated by a discriminator level. The typical spectrum, as shown in FIG. 3, will have an area of low counting rate 42 between the gamma ray events and the beginning of the neutron counts. The total number of thermal neutron counts is found by integration of the counts within area 44 of the spectrum. This region includes all the counts in the spectrum that result from thermal neutron events in detector 18, including the low energy pulses and the thermal peak 40. Once counts per unit of time are determined, this value is related to the capture cross-section of the irradiated fluid as shown as an inverse relationship in FIG. 4 and can be recorded as a function of depth on recorder 38.

Figure 4:
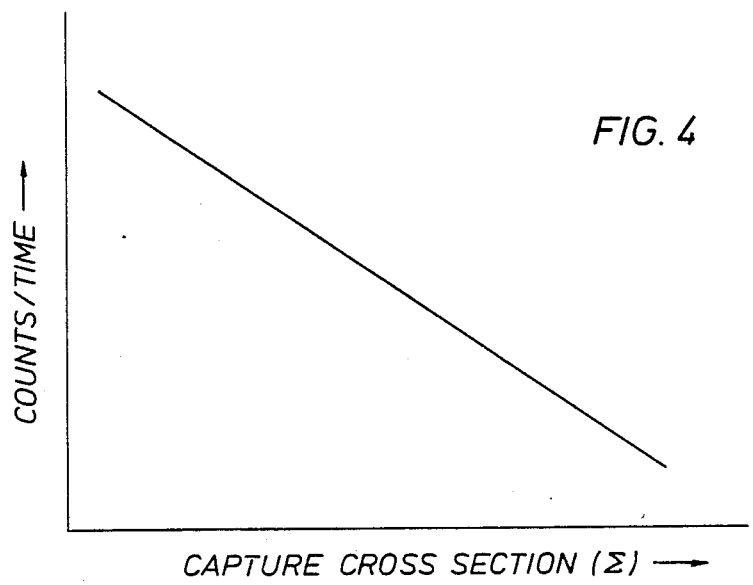
FIG. 4 is a graphic representation of thermal neutron capture cross-section versus detector counts/time.

The slope and intercept of the curve line in FIG. 4 will vary slightly with the size of the borehole in which instrument 14 is operated. The effects of the variance can be overcome by a calibration procedure where response curves for instrument 14 are generated by measuring neutron count rates in water having a known capture cross-section contained in the casing sizes normally encountered in a well-logging enviroment.

In another embodiment of the present invention, pulse height selection is accomplished by use of a suitable discriminator in the subsurface electronic 26 set to pass all electrical pulses from detector 18 above the gamma ray events. Electrical pulses representative of the selected thermal neutrons are then transmitted by way of electrical conductors within cable 30 to conventional counting circuitry in surface electronics.

Additionally, two discriminators can be combined within subsurface electronics 26 to perform conventional single channel functions to allow detection of neutron events within region 44 of the spectrum. Electrical pulses representative of events within the selected interval are transmitted to conventional counting circuitry in surface electronics.

Modifications and variations besides those specifically mentioned may be made in the techniques and structure described herein and depicted in the accompanying drawings without departing substantially from the concepts of the present invention. For example, the present invention could be practiced using a suitable single channel analyzer. Accordingly, it should be clearly understood that the forms of the invention described and illustrated herein are exemplary only, and are not intended as limitations on the scope of the present invention.

The embodiments of the invention in which an exclusive property or privilege is claimed are defined as follows:

1. Apparatus for evaluating the absorption cross-section of fluids within a borehole, comprising:
    an elongated housing member having a cavity formed therein, said cavity being in fluid communication with said borehole;
    a source of high energy neutrons, located at one end of said cavity, for irradiating at least a portion of the fluid contents of said borehole contained within said cavity;
    a neutron detector, located at the other end of said cavity, for detecting radiations emanating from said irradiated fluid;
    a source mounting block of shielding material substantially surrounding said source for collimating said source output into a beam of radiation traversing said cavity;
    a layer of radiation shielding material substantially surrounding said detector;
    a layer of radiation moderating material substantially surrounding said detector;
    means for generating first electrical signals representative of the count rate of said detected radiation; and
    means for converting said first electrical signals into second electrical signals functionally related to the absorption cross-section of said irradiated borehole fluid.

2. The apparatus of claim 1, wherein said source comprises a chemical source having a substantially continuous output of neutrons.

3. The apparatus of claim 2, wherein said source comprises an americium/beryllium source.

4. The apparatus of claim 2, wherein said source comprises a californium source.

5. The apparatus of claim 1, wherein said detector comprises a thermal neutron detector.

6. The apparatus of claim 5, wherein said thermal neutron detector comprises a $^3$He proportional counter.

* * * * *